US006265008B1

(12) United States Patent
Smith et al.

(10) Patent No.: US 6,265,008 B1
(45) Date of Patent: *Jul. 24, 2001

(54) PREPARATION OF NONCARBONATED BEVERAGE PRODUCTS HAVING SUPERIOR MICROBIAL STABILITY

(75) Inventors: James Arthur Smith, Loveland, OH (US); Thomas Ray Graumlich, West Harrison, IN (US); Robert Phillip Sabin; Judith Wells Vigar, both of Cincinnati, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,529

(22) Filed: Nov. 9, 1999

Related U.S. Application Data

(63) Continuation of application No. 08/999,942, filed on Aug. 29, 1997, now Pat. No. 6,126,980, which is a continuation of application No. 08/642,794, filed on May 3, 1996, now abandoned, and a continuation of application No. 08/395,740, filed on Feb. 28, 1995, now abandoned.

(51) Int. Cl.$^7$ ............................... A23L 2/02; A23L 2/44; A23F 3/00
(52) U.S. Cl. .................. 426/330.3; 426/66; 426/271; 426/330.3; 426/330.4; 426/330.5; 426/478; 426/532; 426/590; 426/599
(58) Field of Search .................................. 426/330.3, 66, 426/271, 330.4, 330.5, 478, 532, 590, 599

(56) References Cited

U.S. PATENT DOCUMENTS

| 3,404,987 | 10/1968 | Kooistra et al. . |
| 3,681,987 | 8/1972 | Kohl et al. . |
| 4,717,579 | 1/1988 | Vietti et al. . |
| 4,748,033 | 5/1988 | Syfert et al. . |
| 5,021,251 | 6/1991 | McKenna et al. . |

FOREIGN PATENT DOCUMENTS

| 1792760 | 5/1974 | (DE) . |
| 1642141 | 4/1976 | (DE) . |
| 1242105 | 7/1986 | (SU) . |
| 95 22910 | 8/1995 | (WO) . |
| 677801 | 6/1968 | (ZA) . |
| 677805 | 6/1968 | (ZA) . |

OTHER PUBLICATIONS

Furia, T., *CRC Handbook of Food Additives*, 2d Edition, vol. 1, CRC press (1972), p. 628.
R.B. Tompkin, Indirect Antimicrobial Effects in Foods: Phosphates, *Journal of Food Safety* 6 (1983), pp. 13–27.
R.H. Ellinger, Phosphates in Food Processing, *Handbook of Food Additives*, 2d Edition, CRC Press (1972), pp. 644–780.
Antimicrobial Agents (Preservatives), *The Food Additives Market*, Frost & Sullivan, Inc. (1975(, pp. 68–85.
J. Sofos, *Sorbate Food Preservatives* (1989),pp. 75–76.
Davidson and Juneja, Antimicrobial Agents, *Food Additives* (1990). pp. 88–137.
J. Falbe (ED.) et al., "Römpp, Cemie Lexikon"; 1992, Georg Thieme Verlag, Stuttgard—New York; 9th Edition, vol. 5, pp. 3564–3565; see "Polyphoshate".
Jacobs, M., *Manufacture and Analysis of Carbonated Beverages*, Chemical Publishing Co., Inc. New York, NY (1959), pp. 95–96.

*Primary Examiner*—Helen Pratt
(74) *Attorney, Agent, or Firm*—Kelly L. McDow-Dunham; Tara M. Rosnell; Carl J. Roof

(57) ABSTRACT

Disclosed are noncarbonated beverage products with improved microbial stability, and processes for preparing them. The noncarbonated beverage products have a pH of between 2.5 and 4.5 and comprise from about 300 ppm to about 3000 ppm of a polyphosphate having an average chain length ranging from about 17 to about 60: from about 100 ppm to about 1000 ppm of a preservative selected from the group consisting of sorbic acid, benzoic acid, alkali metal salts thereof and mixtures thereof; from about 0.1% to about 40% by weight of fruit juice; and from about 80% to about 99% by weight of added water, wherein the added water contains from 61 ppm to about 220 ppm of hardness. These noncarbonated beverage products can be stored at ambient temperatures for at least about 28 days without substantial microbial proliferation therein after exposure to beverage spoilage organisms.

16 Claims, No Drawings

PREPARATION OF NONCARBONATED BEVERAGE PRODUCTS HAVING SUPERIOR MICROBIAL STABILITY

This application is a continuing application of U.S. patent application Ser. No. 08/999,942 filed Aug. 29, 1997, now U.S. Pat. No. 6,126,980, which is a continuation of application Ser. No. 08/642,794 filed May 3, 1996 and Ser. No. 08/395,740 filed Feb. 28, 1995, both now abandoned.

FIELD OF THE INVENTION

The present invention relates to noncarbonated beverage products having superior microbial stability. Such stability is provided primarily by a novel combination within the beverage products of sodium polyphosphates having a particular average chain length, a preservative and water of a specified hardness.

BACKGROUND OF THE INVENTION

Controlling microbial growth in noncarbonated dilute juice beverages is an ongoing concern among beverage manufacturers. Such beverage products, when exposed to food spoilage microorganisms, provide an excellent environment for rapid microbial growth. Such exposure can, and infrequently does, result from accidental inoculation of the beverage products during manufacturing or packaging. Food spoilage microorganisms can then rapidly proliferate by feeding on nutrients provided by the fruit juice component of the noncarbonated dilute juice beverages.

Of course, microbial proliferation in noncarbonated dilute juice beverages will not occur without the requisite product exposure to yeast or bacteria. Manufacturing and packaging operations directed to the prevention of such exposure is preferred, but provisions are often made for any infrequent accidental exposure to the isolated beverage product. Such provisions are directed to limiting or preventing subsequent microbial proliferation to thus limit or prevent food spoilage.

Microbial stability of dilute juice beverage products can be provided to some extent by heat pasteurizing during packaging (hot packing) or by packaging under completely aseptic conditions (aseptic packaging). Hot packing involves pasteurization of the beverage and its container such that the resulting sealed beverage product contains no food spoilage microorganism. Likewise, aseptic processing and packaging of a pasteurized beverage will produce a beverage product completely free of food spoilage microorganisms. Accordingly, these beverage products are extremely shelf stable since there are assuredly no food spoilage microorganisms therein to feed on the beverage nutrients and rapidly proliferate.

Aseptic packaging methods, however, are often unsuitable for manufacturing beverages products packaged in certain beverage containers, e.g., rigid containers such as glass, plastic and cans. An aseptic or sterile environment is difficult to maintain during aseptic packaging operations. Frequent cleaning of the packaging line is necessary which is time consuming and expensive.

Hot packing methods are likewise unsuitable for manufacturing certain types of beverage products. This well known method involves heat pasteurization of the juice beverage during packaging at temperatures of between about 85°–105° C. This method is commonly utilized in the manufacture of canned or bottled (glass) beverages. However, not all beverage containers can withstand heat-pasteurization during packaging. For example, flexible containers made from high density polyethylene, which have become more popular with consumers, should not be subjected to the pasteurization temperatures utilized during hot packing operations.

Preservatives have been used in noncarbonated dilute juice beverages to provide some degree of microbial inhibition. Preservatives commonly used in beverage products include, for example, sorbates, benzoates, organic acids, and combinations thereof. However, such preservatives often contribute an off-flavor to the beverage products when used at the levels necessary to inhibit subsequent microbial proliferation during storage. Moreover, when used at concentrations sufficiently low to avoid off-flavor development, such preservatives have heretofore been unable to effectively inhibit the growth of many preservative resistant spoilage microorganisms.

Accordingly, most noncarbonated dilute juice beverages are hot packed in cans or glass bottles or aseptically packaged.

The foregoing considerations involving the effective inhibition of subsequent microbial proliferation in noncarbonated dilute juice beverage products indicates that there is a continuing need to identify noncarbonated dilute juice beverage products that can be manufactured without the use of hot packing or aseptic packing operations, and that are shelf stable for a reasonable amount of time without the use of excessive concentrations of preservatives. It has previously been discovered that certain chilled noncarbonated dilute juice beverage products could be maintained at ambient temperatures for at least about 10 days, preferably for at least about 20 days, without substantial microbial proliferation therein.

Such chilled noncarbonated beverage products include from about 400 ppm to about 1000 ppm of a preservative selected from the group consisting of sorbic acid, benzoic acid, alkali metal salts thereof and mixtures thereof; from about 0.1% to about 10% by weight of fruit juice; and from about 900 ppm to about 3000 ppm of a polyphosphate having the formula

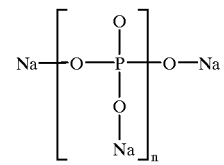

where n averages from about 3 to about 100, preferably from about 13 to about 16, and each M is independently selected from the group of sodium and potassium atoms. The noncarbonated beverage products further comprise from about 80% to about 99% added water by weight of the beverage products, wherein the added water contains from 0 ppm to about 60 ppm of hardness, and preferably from 0 ppm to about 300 ppm of alkalinity. The noncarbonated beverage products have a pH of from about 2.5 to about 4.5 and an ambient display time of at least about 10 days.

Unfortunately, these chilled noncarbonated beverages do not necessarily provide microbial stability at ambient temperature when the added water component of these beverages has a hardness of more than about 60 ppm. Since water supplies used for preparing these noncarbonated beverages frequently have a hardness of well above 60 ppm, it is often necessary to treat or "soften" the water before it can be incorporated into the beverages hereinbefore described.

Conventional methods for softening water can be very expensive. Moreover, it is not always possible or convenient to soften water to less than about 60 ppm using conventional techniques. For example, one conventional method for softening water involves treating the water with Ca(OH)$_2$. This well known method is most suitable and economical for water having an initial hardness of 100 to 150 ppm as calcium carbonate. However, it is not uncommon for water sources to have a hardness in excess of 150 ppm. Another conventional method for softening water involves ion-exchange operations. This method, however, is preferably used to soften water having an initial hardness of 50–100 ppm.

Due to the costs associated with softening of water and to limitations in the methods themselves, it is an object of the present invention to provide noncarbonated beverages having microbial stability at least equal to that of previous noncarbonated beverages, but wherein the added water component can comprise water having a hardness in excess of 60 ppm to avoid the cost and difficulties associated with having to soften the water to a level below 60 ppm first. It is a further object of the present invention to increase the microbial stability of the beverages' of the present invention compared to prior beverages.

SUMMARY OF THE INVENTION

The present invention is directed to noncarbonated dilute juice beverage products having superior microbial stability. These beverages, after an initial contamination level of 10 cfu/ml of spoilage microorganisms, exhibit less than a 100 fold increase in the level of microorganisms when stored at 73° F. for at least 28 days. The beverage products do not require hot packing, aseptic packing or the incorporation of excessive amounts of preservatives to provide the requisite inhibition of microbial proliferation during storage.

Essential elements of the noncarbonated beverage products of the present invention include 1) a preservative system comprising a) from about 100 ppm to about 1000 ppm of a preservative selected from the group consisting of sorbic acid, benzoic acid, alkali metal salts thereof and mixtures thereof, and b) from about 300 ppm to about 3000 ppm of a sodium polyphosphate having the formula

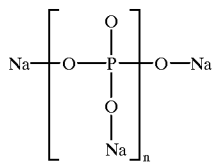

where n averages from about 17 to about 60; 2) from about 0.1% to about 40% by weight of a fruit juice and/or from about 0 to about 0.25% of a tea solids component; and 3) from about 80% to about 99% added water by weight of the beverage products. The added water contains from about 61 ppm to about 220 ppm of hardness. The noncarbonated beverage products have a pH of from about 2.5 to about 4.5.

DETAILED DESCRIPTION OF THE INVENTION

As used herein, "microbial proliferation" means a 100 fold increase or greater in the number of beverage spoilage microorganisms in a noncarbonated beverage product after an initial contamination level of about 10 cfu/ml. Beverage products described as "microbially stable" exhibit less than a 100 fold increase in the level of microorganisms when stored at 73° F. for at least 28 days, following an initial contamination level of 10 cfu/ml of spoilage microorganisms. Beverages described as "microbially unstable" exhibit more than a 100 fold increase in the level of microorganisms when stored at 73° F. for 28 days, following an initial contamination level of 10 cfu/ml of spoilage microorganisms.

As used herein, the term "noncarbonated beverage products" refers to beverage products having less than 1 volume of carbonation.

As used herein, the term "comprising" means various components can be conjointly employed in the preparation of the noncarbonated beverage products of the present invention.

All weights, parts and percentages used herein are based on weight unless otherwise specified.

Preparation of the noncarbonated beverage products of the present invention is described in detail as follows.

The Preservative System

The noncarbonated beverage products of the present invention comprise a preservative system containing a preservative and a food grade polyphosphate. The preservative system is described in detail as follows.

A. The Preservative

Specifically, the beverage products herein comprise from about 100 ppm to about 1000 ppm, preferably from about 200 ppm to about 650 ppm, more preferably from about 400 ppm to about 650 ppm, of a preservative selected from the group consisting of sorbic acid, benzoic acid, alkali metal salts thereof, and mixtures thereof. The preservative is preferably selected from the group consisting of sorbic acid, potassium sorbate, sodium sorbate and mixtures thereof. Most preferred is potassium sorbate.

B. The Food Grade Polyphosphate

The noncarbonated beverage products further comprise a food grade sodium polyphosphate for use in combination with the preservative. Specifically, the beverage products comprise from about 300 ppm to about 3000 ppm, preferably from about 500 ppm to about 3000 ppm, more preferably from about 900 to about 3000 ppm, most preferably from about 1000 ppm to about 1500 ppm, of a sodium polyphosphate characterized by the following structure:

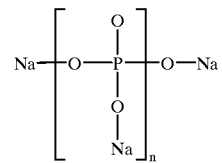

where n averages from about 17 to about 60, preferably from about 20 to about 30. Especially preferred is sodium polyphosphate, a straight chain sodium polyphosphate where n averages about 21.

It has found that these straight chain polymeric phosphates exhibit better antimicrobial activity in the noncarbonated beverage products of the present invention than other food grade phosphates. Well-known food grade phosphates include, for example, orthophosphate, cyclic polyphosphates, monobasic calcium phosphate, dipotassium phosphate, disodium phosphate, sodium phosphate, sodium pyrophosphate, sodium metaphosphate and tetrasodium pyrophosphate.

The polyphosphates for use in the noncarbonated beverage products herein and the selected preservatives also for use in the beverage product herein act synergistically, or at least additivity, to inhibit microbiological growth in the beverage products of the present invention. This combination in the beverage products herein is particularly effective in inhibiting yeast, including preservative resistant *Zygosaccharomyces bailii,* and acid tolerant preservative resistant bacteria.

The use of sorbates, benzoates and mixtures thereof as preservatives in beverage products is well known, as is the mechanism by which such preservatives inhibit microbial growth in food products generally. Sorbates and benzoates are described, for example, by Daividson and Branen, *Antimicrobials in Foods,* Marcel Dekker, Inc., pp. 11–94 (2nd ed. 1993), which description is incorporated herein by reference.

The use of straight chain polyphosphates, alone or in combination with preservatives, to inhibit microbial growth in food products is also well known. Polyphosphates are described, for example, in *Handbook of Food Additives,* CRC Press, pp. 643–780 (2nd ed.1992), which description is incorporated herein by reference. Moreover, the synergistic or additive antimicrobial effect from phosphates combined with a preservative (e.g., sorbates, benzoates, organic acids) in food products is disclosed in U.S. Pat. No. 3,404,987 to Kooistra et al.

Although the use of the above-described polyphosphates and preservatives, alone or in combination, do provide some degree of antimicrobial activity in the beverage products, the novel beverage product of this invention described hereinafter shows outstanding antimicrobial activity against microorganisms commonly associated with the spoilage of beverage products, especially preservative resistant spoilage microorganisms.

Moreover, it has also been found that the particular straight chain polymeric sodium phosphates described herein (e.g., those having an average chain length ranging from about 17 to about 60), provide superior microbial stability to beverages containing them compared to straight chain polymeric phosphates having an average chain length of other than from about 17 to about 60, especially when the water hardness of the added water component of the beverages (hereinafter described) ranges from 61 ppm to about 220 ppm. In particular, the noncarbonated beverages herein. which contain straight chain polymeric sodium phosphates having an average chain length ranging from about 17 to about 30, will exhibit less than a 100 fold increase in the level of microorganisms when stored at 73° F. for at least 28 days, after an initial contamination level of 10 cfu/ml of spoilage microorganisms. Preferably, the beverages herein will exhibit less than a 100 fold increase in the level of microorganisms when stored at 73° F. for at least 60 days, more preferably at least 100 days, after an initial contamination level of 10 cfu/ml of spoilage microorganisms. In general, the lower the water hardness of the added water, the longer the beverage will remain microbially stable.

It is believed that the improved microbial stability of the noncarbonated beverages herein which contain straight chain polymeric sodium phosphates having an average chain length of from about 17 to about 60 can be attributed to the particular characteristics of the straight chain polymeric sodium phosphates employed. It is believed that, upon hydrolysis, straight chain polymeric sodium phosphates having an average chain length of from about 17 to about 60 break down to straight chain polymeric sodium phosphates that are still effective in providing microbial stability to the beverages containing them. By contrast, straight chain polymeric phosphates having an average chain length of less than about 21 will hydrolyze into straight chain polymeric phosphates which are not effective in providing microbial stability to the beverages containing them. Straight chain polymeric phosphates having an average chain length of greater than about 60 are not necessarily soluble in the beverage products described herein.

Another advantage of the straight chain polymeric sodium phosphates of the present invention is that they can provide microbial stability to the beverages herein even when the added water component of the beverages comprises moderately hard to hard water. Thus, there is frequently no need to soften the water before it is incorporated into the beverage.

The Added Water Component

The noncarbonated beverages herein also comprise an added water component. For purposes of defining the beverage products herein, the added water component does not include water incidentally added to the beverage product via other added materials such as, for example, the fruit juice component. The beverage products of the present invention typically comprise from about 80% to about 99% by weight of water, more typically from about 85% to about 93% by weight of water.

The term "hardness" as used herein refers to the presence of calcium and magnesium cations in water. generally. For purposes of the present invention, hardness of the added water component is calculated according to Association of Official Analytical Chemists (AOAC) standards set forth in *Official Methods of Analysis,* published by the AOAC, Arlington, Va., pp. 627–628 (14th ed. 1984), which is incorporated herein by reference. Under AOAC standards, hardness is the sum of $CaCO_3$ equivalents (mg/L) in water, which sum is obtained by multiplying the concentrations (mg/L) found of the following cations in the water by the factors.

TABLE 1

| Cation | Factor |
|--------|--------|
| Ca | 2.497 |
| Mg | 4.116 |
| Sr | 1.142 |
| Fe | 1.792 |
| Al | 5.564 |
| Zn | 1.531 |
| Mn | 1.822 |

Compounds that impart hardness to water are primarily magnesium and calcium carbonates, bicarbonates, sulfates, chlorides and nitrates, although other compounds which can contribute polyvalent cations to water can also impart hardness. Water based on harness is normally classified as soft (0–60 ppm), moderately hard (61–120 ppm), hard (121–180 ppm) and very hard (over 180 ppm).

As stated hereinbefore, the antimicrobial effects of the beverage products of the present invention are evident at water hardness levels above about 60 ppm. In fact, the antimicrobial effects of the noncarbonated beverages of the present invention are evident when the hardness of the added water component of the beverages ranges from 61 to about 220 ppm. Preferably, the hardness of the added water component ranges from 61 to about 200 ppm, more preferably from 61 to about 180 ppm, and most preferably from 61 ppm to about 140 ppm.

The Fruit Juice and/or Tea Solid Component

In one embodiment of the present invention, the beverage products contain fruit juice, which can provide flavor and nutrition. However, it is the fruit juice that also provides an excellent medium on which beverage spoilage microorganisms can feed and rapidly proliferate. It is therefore this fruit juice component of the noncarbonated beverage product herein that necessitates the use of the preservative system and water quality controls described hereinbefore.

Specifically, the noncarbonated beverage product of the present invention can comprise from 0.1% to about 40%, preferably from about 0.1% to about 20%, more preferably from about 0.1% to about 15%, and most preferably from about 3% to about 10%, by weight of a fruit juice (weight percentage based on single strength 2–16° Brix fruit juice). The fruit juice can be incorporated into the beverage product as a puree, comminute or as a single strength or concentrated juice. Especially preferred is the incorporation of the fruit juice as a concentrate with a solid content (primarily as sugar solids) of between about 20° and 80° Brix.

Subsequent microbial proliferation in the noncarbonated beverage product herein will not necessarily be effectively inhibited during storage if fruit juice concentrations exceed about 40% by weight of the beverage products. At fruit juice concentrations less than about 0.1% by weight of the beverage product, the need for stringent antimicrobial systems is less. Even within the fruit juice concentrations of the beverage product herein (between about 0.1% and about 40%), microbial stability will increase with decreased percentages of fruit juice in the beverage product. Variations in the concentration of preservative and polyphosphate within the ranges described hereinbefore can also impact microbial stability. Nonetheless, so long as the concentration of fruit juice, preservative, polyphosphate, and water hardness are within the ranges recited herein for the beverage products, the beverages herein will be microbially stable.

The fruit juice in the noncarbonated beverage products can be any citrus juice, non-citrus juice, or mixture thereof, which are known for use in beverage products Examples of such fruit juices include, but are not limited to, non-citrus juices such as apple juice, grape juice, pear juice, nectarine juice, currant juice, raspberry juice, gooseberry juice, blackberry juice, blueberry juice, strawberry juice, custard-apple juice, pomegranate juice, guava juice, kiwi juice, mango juice, papaya juice, watermelon juice, cantaloupe juice, cherry juice, cranberry juice, pineapple juice, peach juice, apricot juice, plum juice and mixtures thereof, and citrus juices such as orange juice, lemon juice, lime juice, grapefruit juice, tangerine juice and mixtures thereof. Other fruit juices, and nonfruit juices such as vegetable or botanical juices, can be used as the juice component of the noncarbonated beverage products of the present invention.

The noncarbonated beverage products herein can also comprise tea solids. The tea solids can be incorporated into the beverage product in addition to, or in place of, the fruit juice component described hereinbefore.

Specifically, the noncarbonated beverage products can comprise from 0 to about 0.25%, preferably from about 0.02% to about 0.25%, more preferably from about 0.7% to about 0.15%, by weight of tea solids. The term "tea solids" as used herein means solids extracted from tea materials including those materials obtained from the genus Camellia including *C. sinensis* and *C. assaimica,* for instance, freshly gathered tea leaves, fresh green tea leaves that are dried immediately after gathering, fresh green tea leaves that have been heat treated before drying to inactivate any enzymes present, unfermented tea, instant green tea and partially fermented tea leaves. Green tea materials are tea leaves, tea plant stems and other plant materials which are related and which have not undergone substantial fermentation to create black teas. Members of the genus *Phyllanthus, catechu gambir* and Uncaria family of tea plants can also be used. Mixtures of unfermented and partially fermented teas can be used.

Tea solids for use in the noncarbonated beverage products herein can be obtained by known and conventional tea solid extraction methods. Tea solids so obtained will typically comprise caffeine, theobromine, proteins, amino acids, minerals and carbohydrates.

Sweetener

The noncarbonated beverage products of the present invention can, and typically will, contain an artificial or natural, caloric or noncaloric, sweetener. Preferred are carbohydrate sweeteners, more preferably mono- and or di-saccharide sugars.

Specifically, the noncarbonated beverage products will typically comprise from about 0.1% to about 20%, more preferably from about 6% to about 14%, sugar solids by weight of the beverage products. Suitable sweetener sugars include maltose, sucrose, glucose, fructose, invert sugars and mixtures thereof. These sugars can be incorporated into the beverage products in solid or liquid form but are typically, and preferably, incorporated as a syrup, more preferably as a concentrated syrup such as high fructose corn syrup. For purposes of preparing the beverage products of the present invention, these optional sweeteners can be provided to some extent by other components of the beverage products such as the fruit juice component, optional flavorants, and so forth.

Preferred carbohydrate sweeteners for use in the beverage products are sucrose, fructose and mixtures thereof. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein as fructose.

Optional artificial or noncaloric sweeteners for use in the noncarbonated beverage product include, for example, saccharin, cyclamates, sucrose, acetosulfam, L-aspartyl-L-phenylalanine lower alkyl ester sweeteners (e.g., aspartame), L-aspartyl-D-alanine amides disclosed in U.S. Pat. No. 4,411,925 to Brennan et al., L-aspartyl-D-serine amides disclosed in U.S. Pat. No. 4,399,163 to Brennan et al., L-aspartyl-L-1-hydroxymethyl-alkaneamide sweeteners disclosed in U.S. Pat. No. 4,338,346 to Brand, L-aspartyl-1-hydroxyethylakaneamide sweeteners disclosed in U.S. Pat. No. 4,423,029 to Rizzi, L-aspartyl-D-phenylglycine ester and amide sweeteners disclosed in European Patent Application 168,112 to J. M. Janusz, published Jan. 15, 1986, and the like. A particularly preferred sweetener is aspartame.

Other Ingredients

The noncarbonated beverage products herein can further comprise any other ingredient or ingredients typically used as optional beverage ingredients. Such optional ingredients include flavorants, preservatives (e.g., organic acids), colorants and so forth.

The noncarbonated beverage products can further comprise from 0 to about 110% of the U.S. Recommended Daily Allowance (RDA) of vitamins and minerals, provided that such vitamins and minerals do not substantially reduce ambient display times of the noncarbonated beverage products, and that such vitamins and minerals are chemically and physically compatible with the essential elements of the noncarbonated beverage products. Especially preferred are vitamin A, provitamins thereof (e.g., beta carotene), and ascorbic acid, although it is understood that other vitamins and minerals can also be used.

It is well known that certain food grade polyphosphates, such as those described herein, can help inhibit inactivation of the ascorbic acid while in the beverage product. It is also important to note that calcium, iron and magnesium fortification should be avoided since these polyvalent cations can bind to and inactive the polyphosphate component of the noncarbonated beverage products.

Gums, emulsifiers and oils can be included in the beverage products to affect texture and opacity. Typical ingredients include guar gum, xanthan, alginates, mono- and di-glycerides, lecithin, pectin, pulp, cottonseed oil, vegetable oil, food starches and weighting oils/agents. Esters and other flavor and essence oils can also be incorporated into the beverage products.

Acidity

The noncarbonated beverage products of the present invention have a pH of from about 2.5 to about 4.5, preferably from about 2.7 to about 3.5, most preferably from about 3.0 to about 3.3. This pH range is typical for noncarbonated dilute juice beverage products. Beverage acidity can be adjusted to and maintained within the requisite range by known and conventional methods, e.g., the use of food grade acid buffers. Typically, beverage acidity within the above recited ranges is a balance between maximum acidity for microbial inhibition and optimum acidity for the desired beverage flavor and sourness impression. In general, the lower the acidity of the beverage, the more effective the sodium polyphosphate will be at providing microbial stability. Thus, the lower the acidity of the beverage, the less sodium polyphosphate and/or preservative is required to provide microbial stability. Alternatively, when the acidity of the beverage is low, the amount of juice in the beverage can be increased.

Preparation

The noncarbonated beverage products of the present invention can be prepared by conventional methods for formulating noncarbonated dilute juice beverages. Such conventional methods can involve hot packing or aseptic packaging operations, although such operations are not necessary for achieving the extended ambient display times described hereinbefore.

Methods for making dilute juice beverages, for example, are described in U.S. Pat. No. 4,737,375 to Nakel et al., which is incorporated herein by reference. Methods for making beverage products are also described by Woodroof and Phillips, *Beverages: Carbonated & Noncarbonated*, AVI Publishing Co.(rev. ed. 1981); and by Thorner and Herzberg, *Non-alcoholic Food Service Beverage Handbook*, AVI Publishing Co. (2nd ed. 1978).

One method for preparing the beverage products herein involves making a beverage concentrate, adding to it to a sugar syrup containing polyphosphate, and then trimming the mixture with water, sugar syrup, and beverage concentrate to obtain the requisite acidity and material composition. All added water used in such a preparation must have, or be adjusted to, the requisite hardness. In such a method, the beverage concentrate can be prepared by admixing to water (correct hardness) an acidulant (e.g., citric acid), water soluble vitamins, flavorants including juice concentrate, and preservative. An oil in water emulsion, which provides opacity and texture to the beverage products, can be added to the concentrate. The sugar syrup for use in preparing the beverage products is separately prepared by adding sugar syrup (e.g., high fructose corn syrup) to water, and then adding ascorbic acid, polyphosphate and thickening agents to the syrup. Additional preservative can be added to the resulting sugar syrup. The sugar syrup and concentrate are combined to form a noncarbonated beverage product. The noncarbonated beverage product can be trimmed with small amounts of added water, sugar syrup and beverage concentrate to achieve the requisite acidity and composition of the noncarbonated beverage product of the present invention. It can then be pasteurized, packaged and stored. It is understood that other methods, e.g., the methods described hereinafter in the EXAMPLES section, can be used to prepare the noncarbonated beverage products herein The key aspect of the process of the present invention is admixing the requisite materials, in the requisite amounts, to achieve the noncarbonated beverage products of the present invention. Other well known and conventional variations of the above described beverage formulation technique can, therefore, be used to prepare the noncarbonated beverage products herein.

Test Method: Microbial Stability

The term "microbial proliferation" as used herein means a 100 fold increase or greater in the number of beverage spoilage microorganisms in a noncarbonated beverage product after an initial inoculation level of about 10 cfu/ml. Beverage products described as "microbially stable" exhibit less than a 100 fold increase in the level of microorganisms when stored at 73° F. for 28 days, following an initial contamination level of 10 cfu/ml of spoilage microorganisms. Beverages described as "microbially unstable" exhibit more than a 100 fold increase in the level of microorganisms when stored at 73° F. for 28 days, following an initial contamination level of 10 cfu/ml of spoilage microorganisms.

The microbial stability a noncarbonated beverage product can be determined by the following method. Beverage products are inoculated with mixed groups of preservative resistant yeast containing at least four separate yeast isolates, including *Zygosaccharomyces bailii*, and with mixed groups of preservative resistant, acid tolerant bacteria, including Acetobacter species. All yeast and bacteria utilized in the inoculation are previously isolated from preserved fruit juice beverages. Inoculated beverage products are maintained at 20° C. for at least 60 days and aerobic plate cultures performed periodically. Aerobic plate counts of both yeast and bacteria populations are performed as described in the Compendium of Methods for the Microbiological Examinations of Foods, American Public Health Association, Washington, D.C. (edited by C. Vanderzant and D. F. Splittstoesser), which description is incorporated herein by reference. These plate counts are then used to identify the degree of microbial proliferation in the inoculated beverage product.

Test Method: Average Chain Length of Sodium Polyphosphate

Reagents and Equipment:

| Deuterium Oxide ($D_2O$) | |
| --- | --- |
| NMR tubes | 5 mm OD, Wilmad Glass, 507PP |
| | 10 mm OD, Wilmad Glass, 513-5PP |
| NMR tube pressure caps | 5 mm OD, Wilmad Glass, 521 |
| | 10 mm OD, Wilmad Glass, 521-C |
| Disposable transfer pipettes | Curtin Matheson, 355-123 |
| Probe for AC-300 | 5 or 10 mm |
| Pyrex wool | Corning Glass |
| Disposable wipers | Kimberly-Clark, Kim-Wipes |
| Spinner Turbine | 5 mm, Bruker |
| | 10 mm, Bruker |
| Spectrometer | Bruker AC-300, equipped with 5 mm or 10 mm probe |

Procedure:

1. Dissolve about 100 mg of sample in deuterium oxide ($D_2O$) to prepare a solution having a concentration of about 12% by weight of sample. Warm solution gently, if necessary, to aid in solute dissolution. Filter the solution through compressed Pyrex wool, if necessary, to remove any solid particles.

2. Transfer the solution to a clean NMR tube, using a disposable pipette.
3. Place cap on NMR tube. Wipe all smudges and dust particles off the NMR tube with a disposable wiper.
4. Prepare a barcode label including user's initials, spectrometer, microprogram and sample solvent, and attach the label to the barcode label holder.
5. Place the barcode label holder in the NMR tube with lettering up and place the spinner below the holder.
6. Position the sample using the depth gauge.
7. Place the sample tube/spinner/barcode holder assembly into the appropriate chute on the spectrometer sample changer.
8. The spectrum will be automatically obtained, processed and plotted, based on the experiment and solvent information specified on the barcode label.

Spectrometer Parameters:

| | |
|---|---|
| Microprogram | PHG |
| Sweep Frequency | 121.39 MHz |
| Sweep Width | 50 KHz |
| Spectrum Size | 64 K |
| Pulse Width | 2 usec = 45° |
| Pulse Recycle | 10.0 sec |

Inverse gated broadband H-1 decoupling
The average chain length of the sodium polyphosphate is calculated as follows:

Average chain length =
$$2\left(\frac{\text{Integrated Peak Area } I + \text{Integrated Peak Area } T}{\text{Integrated Peak Area } T}\right)$$

Region T for −5 to −10 ppm contains peaks assigned to terminal phosphate units in linear polyphosphates having a chain length of 2 or greater.
Region I from −18 to −24 ppm contains peaks assigned to internal phosphates. Cyclic phosphates present as impurities in the samples also have peaks in Region I and are included in the calculation.
The chemical shifts were referenced to external phosphoric acid.

EXAMPLES

The following includes specific embodiments of the noncarbonated beverage products, and processes for making them, of the present invention. Ingredients for each product are admixed in the order in which they appear. Sodium hexametaphosphate for each product is admixed under high sheer mixing to insure solubility. Ambient display time for each product is at least about 28 days. These specific embodiments are illustrative of the invention and are not intended to be limiting of it.

Embodiment 1
Ingredients
Added Water about 84%
    hardness 140 ppm
Sodium hexametaphosphate (n=22.76) 1500 ppm
Potassium sorbate 200 ppm
Fruit juice concentrate 1.75%
    (as single strength juice 10%)
Citric acid about 0.24%
HFCS-55 about 13.5%

Embodiment 2
Ingredients
Added water about 98%
    hardness 140 ppm
Sodium hexametaphosphate (n=23.14) 1500 ppm
Potassium sorbate 200 ppm
Fruit Juice concentrates 1.75%
    (as single strength juice 10%)
Citric acid about 0.24%
Aspartame about 500 ppm Comparative Data Noncarbonated beverage samples (A–C) are prepared and tested for microbial stability according to the test method described hereinbefore in the Analytical Methods section. Each sample contains 200 ppm sorbate and 98% by weight of added water having a hardness of 140 ppm. Sample A contains 1500 ppm of sodium hexametaphosphate with an average chain length of about 13. Sample B (representative of the present invention) contains 1500 ppm of a sodium hexametaphosphate with an average chain length of about 21. Each sample also contains other minor ingredients which had substantially no effect on microbial proliferation. Test results are summarized below.

| | | LOG (cfu/ml) | | |
|---|---|---|---|---|
| Sample | 0 days | 29 days | 58 days | 99 days |
| A | 1.10 | 1.33 | 4.10 | 5.2 |
| B | 1.03 | 2.58 | 2.57 | 2.40 |

Both samples are microbially stable after 29 days. However, after 58 days, Sample A is no longer microbially stable, while Sample B remains microbially stable even after 99 days.

What is claimed is:

1. Noncarbonated beverage product comprising:
    (a) from about 100 ppm to about 1000 ppm of a preservative selected from the group consisting of sorbic acid, benzoic acid, alkali metal salts thereof and mixtures thereof;
    (b) from about 300 ppm to about 3000 ppm of a polyphosphate having the formula:

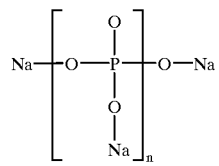

where n averages from about 17 to about 60; and
    (c) added water having from 61 ppm to about 220 ppm of hardness;
wherein the beverage product has a pH of from about 2.5 to about 4.5 and wherein the beverage product, after an initial contamination level of 10 cfu/ml of spoilage microorganisms, exhibits less than a 100 fold increase in the level of microorganisms when stored at 73° F. for at least 28 days.

2. The beverage product of claim 1, wherein the preservative is potassium sorbate and the sodium polyphosphate has an average chain length ranging from about 20 to about 30.

3. The beverage product of claim 2, comprising from about 100 ppm to about 1500 ppm sodium polyphosphate and from about 200 ppm to about 650 ppm potassium sorbate.

4. The beverage product of claim 3, wherein the water has from 61 ppm to about 180 ppm of hardness.

5. The beverage product of claim 1, comprising from about 200 ppm to about 650 ppm potassium sorbate.

6. The beverage product of claim 5, wherein the added water has 61 ppm to about 180 ppm of hardness.

7. The beverage product of claim 1, further comprising from about 6% to about 20% by weight of a carbohydrate sweetener selected from the group consisting of fructose, maltose, sucrose, glucose, invert sugars and mixtures thereof.

8. The beverage product of claim 1, further comprising from about 0.1% to about 1% by weight of a noncaloric sweetener selected from the group consisting of saccharin, cyclamates, acetosulfam, L-aspartyl-L-phenylalanine, lower alkyl ester sweeteners, L-aspartyl-D-alanine amides, L-aspartyl-D-serine amides, L-aspartyl-L-1-hydroxymethyl-alkaneamide sweeteners, L-aspartyl-1-hydroxyethylalkaneamide sweeteners, and L-aspartyl-D-phenylglycine ester and amide sweeteners.

9. Noncarbonated beverage product, comprising:

(a) from about 100 ppm to about 1000 ppm of a preservative selected from the group consisting of sorbic acid, benzoic acid, alkali metal salts thereof and mixtures thereof;

(b) from about 300 to about 3000 ppm of a polyphosphate having the formula:

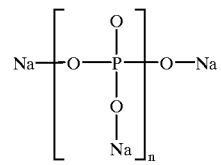

where n averages from about 17 to about 60; and (c) added water having from 0 ppm to about 220 ppm of hardness;

wherein the beverage product has a pH of from about 2.5 to about 4.5.

10. The beverage product of claim 9, wherein the preservative is potassium sorbate and the sodium polyphosphate has an average chain length ranging from about 20 to about 30.

11. The beverage product of claim 10, comprising from about 1000 ppm to about 1500 ppm sodium polyphosphate and from about 200 ppm to about 650 ppm potassium sorbate.

12. The beverage product of claim 11, comprising from about 200 ppm to about 650 ppm potassium sorbate.

13. The beverage product of claim 12, wherein the added water has 61 ppm to about 180 ppm of hardness.

14. The beverage product of claim 9, wherein the added water has from 61 ppm to about 180 ppm of hardness.

15. The beverage product of claim 9, further comprising from about 6% to about 20% by weight of a carbohydrate sweetener selected from the group consisting of fructose, maltose, sucrose, glucose, invert sugars and mixtures thereof.

16. The beverage product of claim 9, further comprising from about 0.1% to about 1% by weight of a noncaloric sweetener selected from the group consisting of saccharin, cyclamates, acetosulfam, L-aspartyl-L-phenylalanine, lower alkyl ester sweeteners, L-aspartyl-D-alanine amides, L-aspartyl-D-serine amides, L-aspartyl-L-1-hydroxymethyl-alkaneamide sweeteners, L-aspartyl-1-hydroxyethylalkaneamide sweeteners, and L-aspartyl-D-phenylglycine ester and amide sweeteners.

* * * * *

UNITED STATES PATENT AND TRADEMARK OFFICE
CERTIFICATE OF CORRECTION

PATENT NO.    : 6,265,008 B1
DATED         : July 24, 2001
INVENTOR(S)   : James Arthur Smith et al.

It is certified that error appears in the above-identified patent and that said Letters Patent is hereby corrected as shown below:

Column 2,
Lines 40-46, delete the formula in its entirety and insert the following therefore:

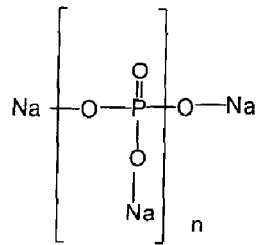

Column 3,
Lines 42-48, delete the formula in its entirety and insert the following therefore:

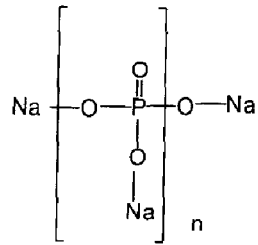

Column 4,
Lines 43-49, delete the formula in its entirety and insert the following therefore:

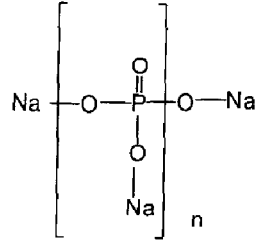

Column 12,
Lines 51-57, delete the formula in its entirety and insert the following therefore:

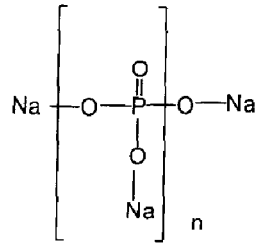

UNITED STATES PATENT AND TRADEMARK OFFICE
CERTIFICATE OF CORRECTION

PATENT NO. : 6,265,008 B1
DATED : July 24, 2001
INVENTOR(S) : James Arthur Smith et al.

It is certified that error appears in the above-identified patent and that said Letters Patent is hereby corrected as shown below:

Column 14,
Lines 2-8, delete the formula in its entirety and insert the following therefore:

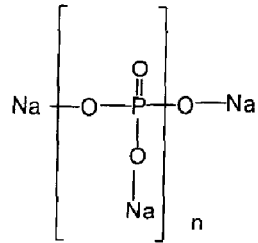

Signed and Sealed this

Twelfth Day of April, 2005

JON W. DUDAS
*Director of the United States Patent and Trademark Office*